United States Patent
Surendran (10) Patent No.: US 7,801,901 B2
(45) Date of Patent: Sep. 21, 2010

(54) TRACKING STORYLINES AROUND A QUERY

(75) Inventor: Arungunram C. Surendran, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 302 days.

(21) Appl. No.: 11/532,399

(22) Filed: Sep. 15, 2006

(65) Prior Publication Data

US 2008/0104048 A1   May 1, 2008

(51) Int. Cl.
*G06F 17/30* (2006.01)
(52) U.S. Cl. .................................... 707/748
(58) Field of Classification Search .............. 707/5, 707/6, 999.005, 999.006, 748
See application file for complete search history.

(56) References Cited

U.S. PATENT DOCUMENTS

| | | | |
|---|---|---|---|
| 6,154,213 A * | 11/2000 | Rennison et al. | 715/854 |
| 6,233,571 B1 | 5/2001 | Egger et al. | |
| 6,363,377 B1 | 3/2002 | Kravets et al. | |
| 6,401,118 B1 | 6/2002 | Thomas | |
| 6,480,843 B2 | 11/2002 | Li | |
| 6,760,744 B1 * | 7/2004 | Halaas et al. | 709/201 |

(Continued)

FOREIGN PATENT DOCUMENTS

WO     2005098675     10/2005

OTHER PUBLICATIONS

Rhodes, et al. "Just-in-Time Information Retreval Agents" (2000) IBM Systems Journal vol. 39, Nos. 3 & 4 MIT Media Laboratory, 18 pages.

(Continued)

*Primary Examiner*—James Trujillo
*Assistant Examiner*—Jorge A Casanova
(74) *Attorney, Agent, or Firm*—Lee & Hayes, PLLC (57) ABSTRACT

The claimed subject matter relates to a system and method that effectuates queryline tracking by constructing and utilizing incremental aspect models that employ probabilistic and/or spectral techniques to discover themes within documents delivered in a stream over time. The system and method upon discovery of a theme or enhancements to already induced or surfaced themes can generate a notification for propagation to a user via one or more user specified communications and/or computing modalities.

17 Claims, 10 Drawing Sheets

U.S. PATENT DOCUMENTS

| | | | |
|---|---|---|---|
| 6,772,120 B1* | 8/2004 | Moreno et al. | 704/256 |
| 6,772,170 B2* | 8/2004 | Pennock et al. | 707/102 |
| 6,775,677 B1* | 8/2004 | Ando et al. | 707/102 |
| 6,873,990 B2 | 3/2005 | Oblinger et al. | |
| 7,089,237 B2 | 8/2006 | Turnbull | |
| 7,181,438 B1* | 2/2007 | Szabo | 707/2 |
| 7,275,052 B2* | 9/2007 | Peh | 707/2 |
| 7,716,226 B2* | 5/2010 | Barney | 707/748 |
| 2005/0198056 A1* | 9/2005 | Dumais et al. | 707/101 |
| 2005/0246321 A1 | 11/2005 | Mahadevan et al. | |
| 2005/0278321 A1* | 12/2005 | Vailaya et al. | 707/3 |
| 2006/0004752 A1* | 1/2006 | Harel et al. | 707/6 |
| 2006/0026152 A1 | 2/2006 | Zeng et al. | |
| 2006/0031219 A1* | 2/2006 | Chernyak et al. | 707/5 |
| 2006/0047701 A1* | 3/2006 | Maybury et al. | 707/104.1 |
| 2006/0101102 A1* | 5/2006 | Su et al. | 707/205 |
| 2006/0129843 A1* | 6/2006 | Srinivasa et al. | 713/189 |
| 2006/0173819 A1 | 8/2006 | Watson | |
| 2006/0242140 A1* | 10/2006 | Wnek | 707/5 |
| 2007/0083509 A1* | 4/2007 | Wu et al. | 707/6 |
| 2007/0106662 A1* | 5/2007 | Kimbrough et al. | 707/5 |
| 2007/0156665 A1* | 7/2007 | Wnek | 707/4 |
| 2007/0198508 A1* | 8/2007 | Yoshimura | 707/5 |

OTHER PUBLICATIONS

Zamir, et al. "Grouper: A Dynamic Clustering Interface to Web Search Results" (1999) Proceedings of the Eighth International World Wide Web Conference, 22 pages.

Kumar, et al. "A Graph-Theoretic Approach to Extract Storylines from Search Results" (2004) Research Track Paper Proceedings of the tenth ACM SIGKDD international conference on Knowledge discovery and data mining, pp. 216-226.

* cited by examiner

FIG. 7 — Day 1

| Dole | Wage | McDougal | drug | Gingrich |
|---|---|---|---|---|
| Powell | Clinton | Whitewater | Hatch | terror |
| Clinton | Minimum | Susan | Marjuana | nuclear |
| convention | bill | Arkansas | coppl | Libya |
| Kemp | legislation | sentence | McCurry | Iraq |

FIG. 8 — Day 2

- McCurry
- Yeltsin
- Chechnya
- strenuous
- Russian

FIG. 9 — Day 3

- Zogby
- vote
- gap
- poll
- narrow

FIG. 10 — Day 5

- FDA
- tobacco
- smoke
- cigarette
- advert

FIG. 11 — Day 7

- train
- handgun
- Brady
- Ohio
- Huntington

FIG. 12 — Day 8

- read
- Jeep
- liter
- Americorp
- Cherokee

FIG. 13 — Day 9

- Jackson
- Cuomo
- Jesse
- welfare
- disagree

FIG. 14 — Day 10

| Morris | litigation |
|---|---|
| resign | tobacco |
| Dick | lung |
| prostitute | cancer |
| tabloid | letter |

Day 9

FIG. 17

Day 10

TRACKING STORYLINES AROUND A QUERY

BACKGROUND

We currently live in an interconnected world where time critical and/or time sensitive information can be disseminated via a plurality of communications means. For example, today users can obtain or receive information relating to current affairs, sports, economic forecasts, stock market analysis through email, news feeds, etc. In fact there is a veritable superabundance of information from various sources that are constantly being directed at users and vying for their attention. Moreover, much the information obtained, received, and/or supplied by way of news feeds, emails and the like, can be considered for the most part to be irrelevant to a user's needs and/or interests.

Individuals often wish to enquire about important news stories that surround particular persons, events, entities, and/or objects. Additionally, multiple stories can transpire in relation to these particular persons, events, entities, and/or objects, and further these stories can develop over time. For example, a stockbroker may wish to be kept informed about every news item, and bit of information associated with certain corporations that constitute the one or more stock portfolios that he/she might be managing. Information surrounding these corporations, and changes thereto, whether good or bad, can have a profound impact on the valuation of the portfolio in its entirety, corporations in the portfolio in particular, and the buying and selling decisions ensuing there from. Thus, a stockbroker may want to be kept abreast of all events that can occur with respect to a particular corporation, and in general with the industry sector in which the corporation operates. However, to date, there has been no mechanism capable of segregating changing information into particular stories and thereafter tracking these stories over time.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter relates to an information retrieval system and method, and more particularly to an information retrieval system and method that evolves over time. To this end, as disclosed and described herein, is a queryline tracking system and method.

Queryline tracking allows an individual to dynamically track all stories that occur over time, that relate to a particular person, place or thing. For example, an individual may wish to follow news about the "President". Typically, such a query will return a flat list of articles not only about the President of the United States but also articles relating to Presidents of companies, Presidents of other countries, or the President's Cup. Currently, where an individual wants to track this or for that matter other queries over a period of time, the individual may have to enter the query every day, or use a news alert system that nevertheless still returns a flat list of documents that can consist of stories that the individual has already seen.

The queryline tracking system disclosed herein can collect the results to a submitted query over time and divides and summarizes the results into appropriate themes. The system automatically and dynamically keeps track of themes that an individual has been informed about, and alerts the individual to new themes not previously seen as soon as the system has discovered these new themes.

In one aspect, the queryline tracking system can be implemented by constructing and utilizing incremental aspect models that employ probabilistic and/or spectral methods to analyze collections of documents and to discover underlying themes one at a time within these analyzed documents. The queryline tracking system looks at all data (e.g., news articles supplied via Internet web feed) presented to it, and focuses in on a subset of words and documents that it believes represents a topic/theme. The system can also rank and/or score all documents in terms of relevance to themes/topics, and further summarize each theme with keywords. The system can thereupon utilize this summarization to inform a user, via a computer and/or communications platform of the user's choice, of new and/or previously unseen themes that the system discovers over time.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

A "topic model" as described and disclosed herein can typically be conceptualized as a model that discovers different themes or stories that underlie sets of documents. For example, emails between a person and their travel agent regarding a trip to watch the Super Bowl can be thought of as belonging to the topics "sport" and "travel". At its simplest, topic models can simply consist of clustering documents into similar groups. Each cluster or group representing a particular "topic". Sometimes keywords can be extracted from each cluster or group to represent each group or cluster. A number of techniques can be employed to create topic models, such as Latent Semantic Indexing (LSI), Probabilistic Latent Semantic Indexing (PLSI), and Latent Dirichlet Allocation (LDA), to name but a few. Of the aforementioned topic model creation techniques, PLSI and LDA are also known as "aspect models". In their common form the topic models created by these creation techniques (e.g., LSI, PLSI, LDA, etc.) to date have been static models that once created cannot be easily be modified when new data arrives.

In contrast, topic models that change over time can be called "evolving topic models". Such evolving or dynamically changing or growing topic models can be constructed where new data constantly arrives, (e.g., in a stream of data such as web feed, email, etc.). Techniques that can be utilized to produce such evolving topic models can include, for example, a LSI modeling approach known as Iterative Residual Scaling (IRR), a LDA modeling approach called the hierarchical Chinese Restaurant Process (CRP), and the like. Additionally, incrementally built aspect models (BAM) that dynamically grow and evolve over time can also be utilized. It should be noted that LSI techniques are generally considered to be spectral approaches, LDA modalities are widely considered to be probabilistic techniques, and BAM is considered to be a combination of probabilistic and spectral methods thus enabling models constructed with BAM to not only grow with data, but also to shrink (eliminate old or unused topics) as needed.

Figure 1:
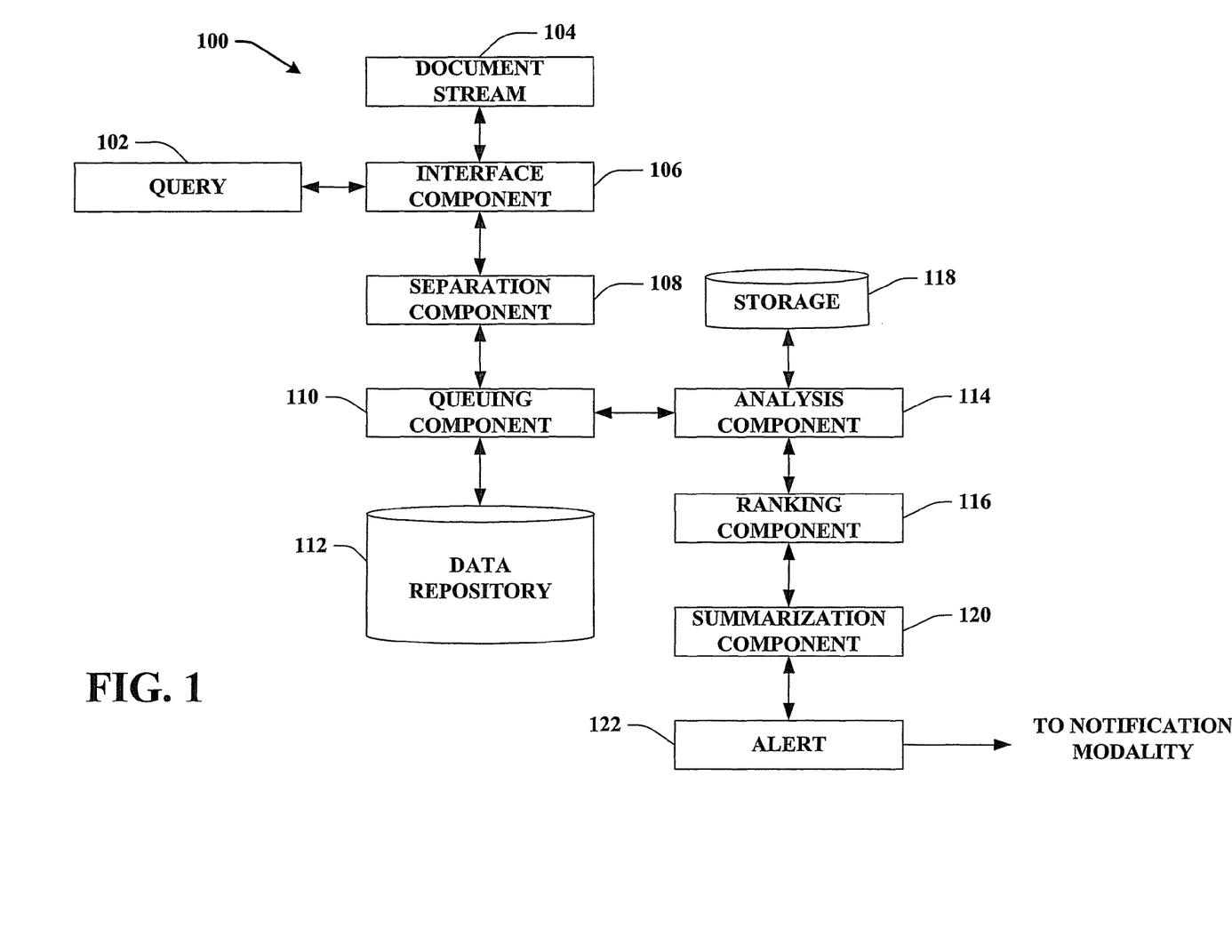
FIG. 1 illustrates a queryline tracking system that receives a query and documents in a stream and that generates an alert.

FIG. 1 illustrates a queryline tracking system 100 that receives as input query 102 and stream of documents 104 and generates alert 120 that can be propagated to a user via a notification modality (not shown), such as a computing and/or communications device (e.g., Smartphone, cell phone, laptop computer, handheld computer, Personal Digital Assistant, and the like). System 100 includes interface component 106 that receives query 102. Query 102 can be received from a user through one of many diverse modalities, such as, for example, an application executing on a machine (e.g., Smartphone, cell phone, laptop computer, tablet computer, notebook computer, etc.), alternatively or additionally, query 102 can be received by interface component 106 via direct communications with a wireless and/or wired human interface device (e.g., keyboard, mouse, tablet, and the like). Query 102 can be expressed as, and can relate to, a sequence of text representative of a topic that the user expresses an interest in. For example, a user can be a financial analyst and thus can be interested in documents that relate to financial matters generally, and to XYZ, Inc. in particular. As a further example, the user can be a casual user who evinces an particular interest in sports, and as such may want to be informed regarding news items about cricket, soccer, rugby, hockey, baseball, basketball, and the like.

Interface component 106 additionally can receive one or more document stream 104 that can emanate from news and/or sports web feed services distributed over the Internet, for example. Alternatively, document stream 104 can be supplied by distributed databases or other data repositories located on the Internet, or dispersed over Extranets, Intranets, and the like. Moreover, document stream 104 can also be received via electronic mail services.

Interface component 106 upon receipt of query 102 and documents contained in stream 104, conveys query 102 and documents contained in the stream 104 to separation component 108. Separation component 108 compares query 102 with the contents of each document received to discover whether query 102 exists, explicitly and/or implicitly, in the received document. Where separation component 108 ascertains that the received document contains reference to query 102, separation component 108 selects the document and conveys it to queuing component 110, otherwise where the received document contains no reference to query 102, interface component 106 disregards the received document.

Queuing component 110 upon receipt of an identified document from separation component 108 accumulates the documents that contain reference to query 102 until such time as an optimal minimum number of identified documents (e.g., 1, 2, 3, . . . ) have been collected within a given period (e.g., one second, minute, day, week, month, year, etc.). Where insufficient documents have accrued over the period specified, queuing component 110 can store currently extant documents in data repository 112 until further relevant documents arrive to meet the optimal minimum number. Both the optimal minimum number of documents collected and the time period can be specified by a user of the system, or can be automatically set by the system. Once queuing component 110 has collected an optimal minimum number of identified documents, these collected documents can be delivered to analysis component 114.

Analysis component 114 can build and utilize topic models (e.g., one or more incremental aspect model) that employ probabilistic and/or spectral methods in order to analyze the collection of documents to discover underlying themes associated with each document in the collection one at a time. Topic models that employ probabilistic and/or spectral methods to incrementally discover themes/topics are suited to handling data that arrives over time. This allows the queryline tracking system disclosed herein to discover new themes day after day as new documents arrive. Accordingly, analysis component 114 looks at data presented to it, and zooms in on subsets of words and documents that it believes represent a theme. For example, if a word-document co-occurrence is represented by a bi-partite graph, then the act of zooming in is equivalent to selecting a part of the graph that is well connected to form a theme.

Once analysis component 114 has located a theme, it can supply the theme to ranking component 116 that ranks and/or scores each document that comprises the collection in terms of the document's relevance to the located theme. Alternatively and/or additionally, analysis component 114 can store the topic model (newly constructed and/or already existing) to storage 118. Storage 118 can also be employed to cache other information (e.g., news items that a user has been notified about but has not read, news items that a user has already read, etc.) that can be beneficially utilized by analysis component 114. As will be understood by those conversant in the art, words and documents that fall within the purview of well-connected sections of the bi-partite graph can be assigned higher rankings or scores; the more central the word or document is to a theme, the higher the rating. Utilization of analysis component 114 and ranking component 116 to locate a theme and to contemporaneously or subsequently rank or score documents in relation to located topics/themes can be thought of as inducing hidden themes.

Once ranking component 116 has ranked or scored documents in relation to identified themes, it can supply the scored or ranked documents together with associated themes to summarization component 120 that summarizes each identified theme with keywords and/or sentence summaries, or any other type of summarization, including summarization using a set of pre-defined concepts. At which point alert 122 can be propagated to a notification modality such as for example, microprocessor based consumer and/or industrial electronics, software/hardware applications running on personal computers (e.g., email applications, web browsers, instant messengers, . . . ), watches, Personal Digital Assistants (PDAs), cell phones, smart phones, pagers, and the like.

Figure 2:
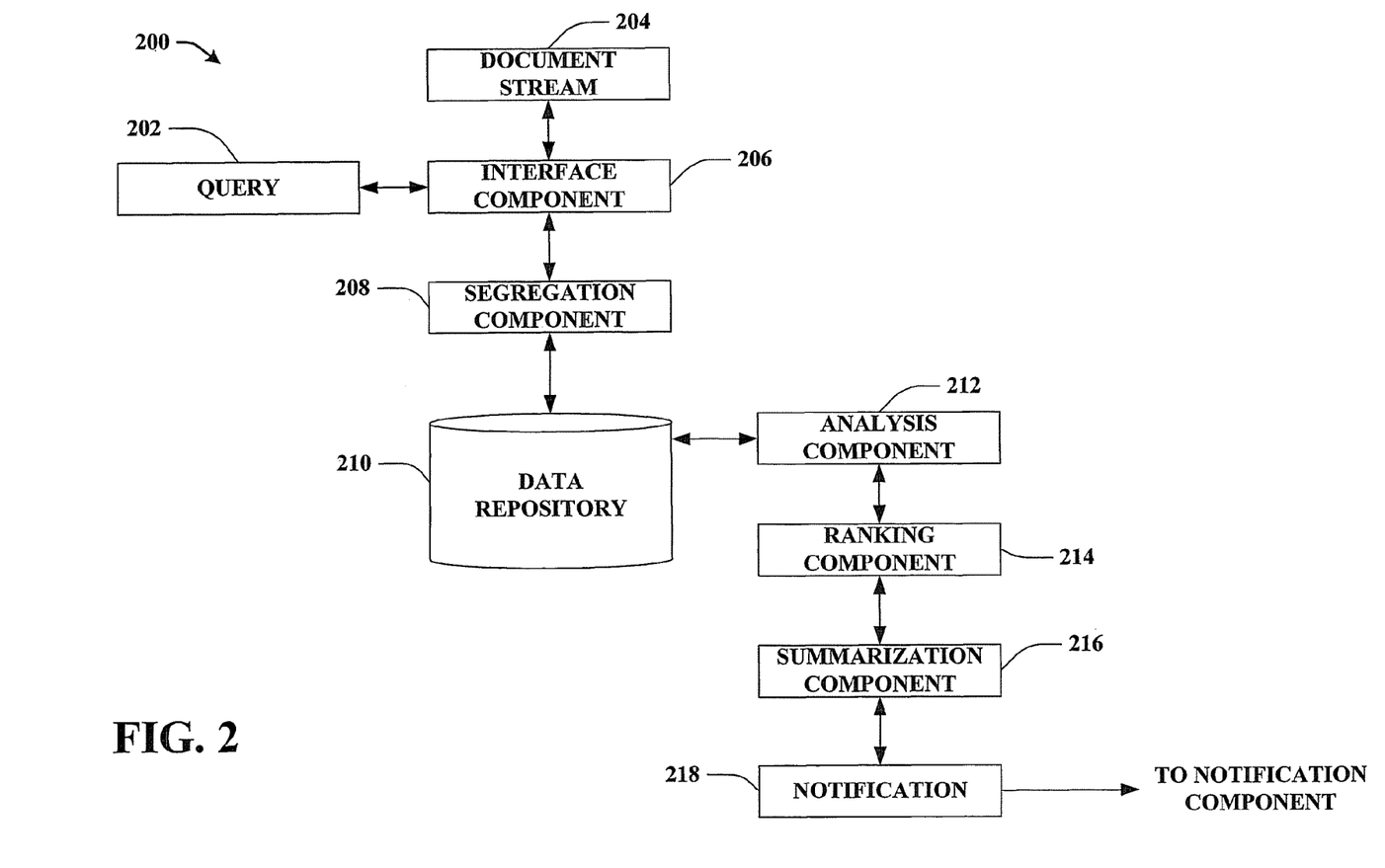
FIG. 2 depicts an alternative aspect of a queryline tracking system that receives a query and documents included in a stream and that generates a notification.

FIG. 2 depicts an alternative aspect of a queryline tracking system 200 that receives query 202 and document stream 204 and generates notification 218 for subsequent use by a notification component (not shown). System 200 includes interface component 206 that receives query 202 and document stream 204. Query 202 for example, can be received by interface component 206 from a user via wired or wireless human interface device (e g., keyboard, microphone, . . . ), or alternatively and/or additionally, query 202 can be received from some other form of user handheld device, such as a cell phone, Personal Digital Assistant, hand held computer, and the like, for example. Document stream 204 can be received by interface component 206 in the form news and/or sports web feeds dispersed over the Internet.

Interface component 206 upon receipt of query 202 and stream of documents 204 directs these input feeds to segregation component 208. Segregation component 208 compares received query 202 with documents received in the stream 204 to identify those documents that query 202 explicitly or implicitly associated with the document. For example, entered query 202 can be "NBA", where documents explicitly contain the string "NBA" such documents can be earmarked for selection by segregation component 208. In addition, documents that include the string "basketball" can also be selected by the segregation component 208 based on the fact that basketball and "NBA" can be perceived as associated word. Such implicit associations are referred to as broad match associations, and can be provided for example, by way of a dictionary and/or thesaurus lookup (e.g., via data table, database, etc.). Thus, segregation component 208 selects those documents included in the document stream 204 that are related to query 202. Such relations between query 202 and documents contained in the document stream 204 can be defined in many ways. For example, the relationship can be defined as the number of times query 202 occurs in a particular document, whether query 202 and words associated with the document are synonymous with one another, and/or whether there is a strong correlation between the words contained in the document and query 202. For example, in the case of a document eliciting a strong correlation between words contained in the document and query 202, if query 202 comprises the string "Bush" and the words in the document are "President of the United States", then these two terms (i.e., "Bush" and "President of the United States") currently can have a very strong correlation with one another, and as such where the query 202 is the string "Bush" documents that can be selected by segregation component 208 can include documents that contain the "President of the United States" without the necessity that query string "Bush" ever appear in the selected document(s).

Once segregation component 208 has selected documents from document stream 204 that have a relationship with query 202, the selected/identified documents can be appropriately stored in data repository 210 for further analysis by an analysis component 212.

Analysis component 212 can periodically retrieve identified documents from data repository 210 and thereupon can utilize previously induced/surfaced themes to attempt to distribute selected documents amongst these previously surfaced/induced themes. Previously induced/surfaced themes can be obtained though use, for example, of a classifier that has already learned the classification and categories surrounding query 202, and/or a clustering system that has previously clustered themes around query 202. Where analysis component 212 is unable to classify documents according to previously surfaced themes, analysis component 212 can employ topic models to induce underlying themes associated with each document that analysis component 212 has not been able to cluster, classify and/or categorize. Thus to this end, analysis component 212 can investigate data presented it and focus in on subsets of words and documents that it believes represent a theme.

Once analysis component 212 has located a theme, it can supply the theme to ranking component 214. Ranking component 214 can score, order, and/or rank each document to ascertain the relevance that the document has with respect to the theme to which the analysis component 212 has assigned it. Based on this ranking, scoring and/or ordering the ranking component 214 can supply the ranked documents together with associated themes to summarization component 216 that can summarize each identified theme with keywords which can be employed to generate an notification 218 to a notification component (not shown). In addition, the ranking component can also rank, order and/or score new documents that are evaluated as belonging to already existing/known/seen themes.

Figure 3:
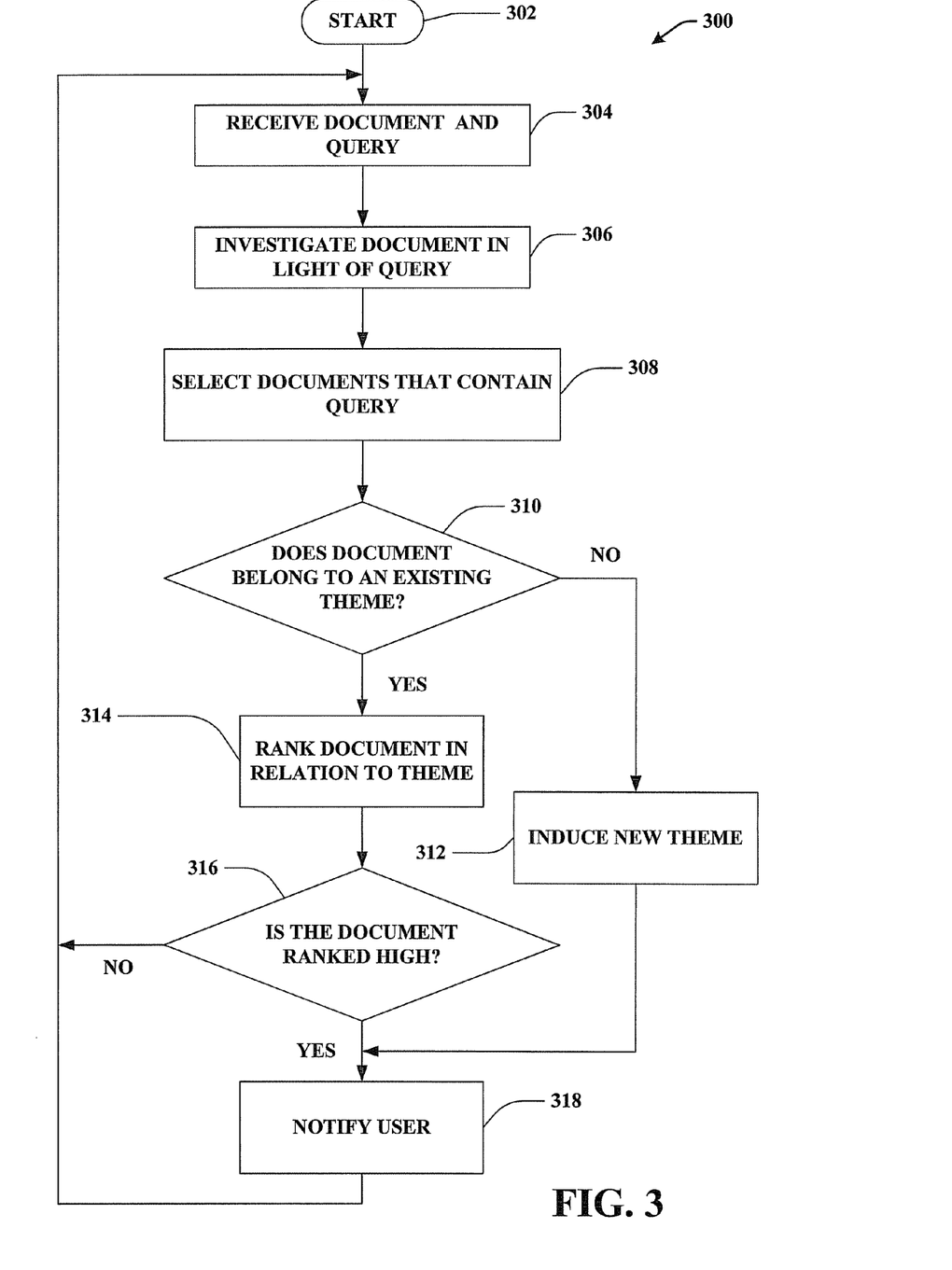
FIG. 3 illustrates a flow diagram of a methodology that facilitates and effectuates queryline tracking.

In view of the exemplary systems described supra, methodologies that may be implemented in accordance with the disclosed subject matter will be better appreciated with reference to the flow chart of FIG. 3. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

FIG. 3 depicts a flow diagram of a methodology 300 that facilitates and effectuates queryline tracking. The methodology commences at 302 at which point various processor initialization tasks and background activities are performed as power is applied to the queryline tracking system. Once these tasks have been performed the method proceeds to 304. At 304 inputs in the form of a stream of documents and a query in the form of a sequence of text representative of a topic that a user elicits an interest in can be received. At 306 the methodology investigates each document received in the stream of documents in light of the received query. At 308 where there is a correspondence, either explicit or implicit, between the received query and the document under investigation, the methodology selects the document under investigation for further scrutiny and analysis. At 310 a decision is made as to whether the document in question belongs to an existing theme. Where the answer to the decision at 310 is negative (NO) the method proceeds to 312 at which point a new theme is generated by the methodology, wherein generation of a new theme is undertaken using a topic models that can employ probabilistic and/or spectral techniques to surface a new theme that can be associated with the input query at which point the method proceeds to 318. If the answer to the query posited at 310 is affirmative (YES) the method progress to 314 where documents (those that have previously been clustered under a particular theme, and newly clustered documents) are ranked, scored and/or ordered in relation to one another and with respect to the theme under which the documents have been associated, at which point the methodology proceeds to 316. At 316 a decision is made as to whether the document under consideration has been ranked or scored high relative to other documents that have been classified under a particular theme. Where the answer to this query is NO, the method returns to 304. If however, the answer to the query elicited at 316 is YES the method proceeds to 318 at which point a notification containing keywords is generated via utilization one or more summarization techniques and the notification so generated is propagated to a user, at which point the method returns to 304.

Figure 4:
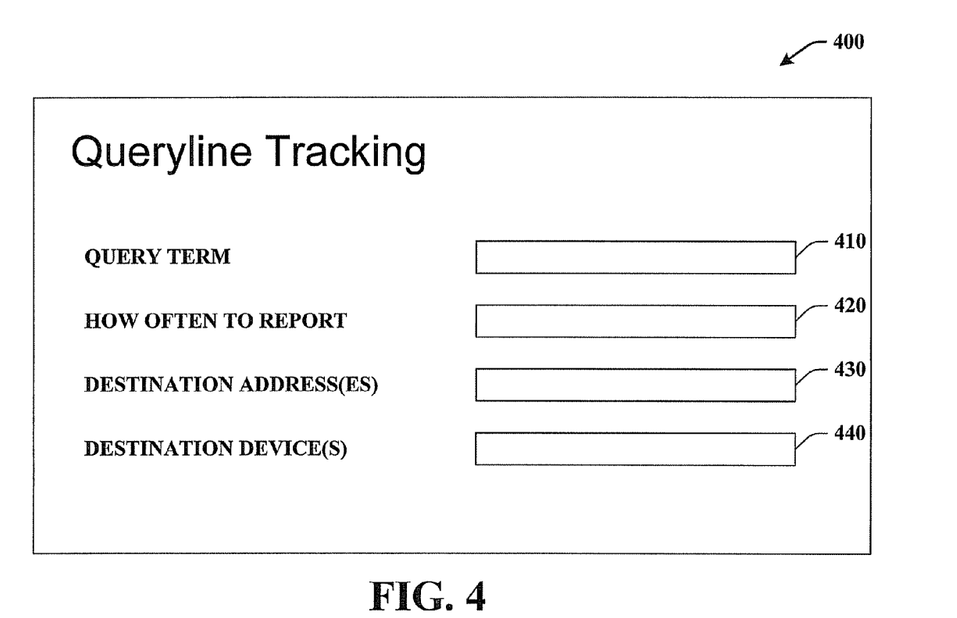
FIG. 4 illustrates a queryline tracking interface in accordance with an aspect of the claimed subject matter.

FIG. 4, illustrates therein a queryline tracking interface 400 that can be displayed on a user computing and/or communications device such as for example, Smartphone, cell phone, laptop computer, Personal Digital Assistant, and the like. Queryline tracking interface 400 can include fields 410-440 wherein an individual can enter data regarding information he/she is interested in. In field 410 individuals can enter, for example, a string of text associated with data in which they elicit an interest. For example, if the individual is a financial analyst data that may be entered can relate to the New York Stock Market and corporations listed thereon. In field 420 users can indicate how often (e.g., instantly, on the hour, twice a day, once a week, etc.) that they wish to be informed about new themes that the queryline tracking discovers. In field 430 individuals can indicate one or more destination addresses to which to direct a notification once it is generated by the queryline tracking system. Additionally, in field 440 individuals can specify the type of device to which to direct a notification when it is propagated. Specification of the type of device to which to direct the notification allows the queryline tracking system to custom the notification to accommodate the wide variety of display devices available on disparate computing and communications modalities.

Figure 5:
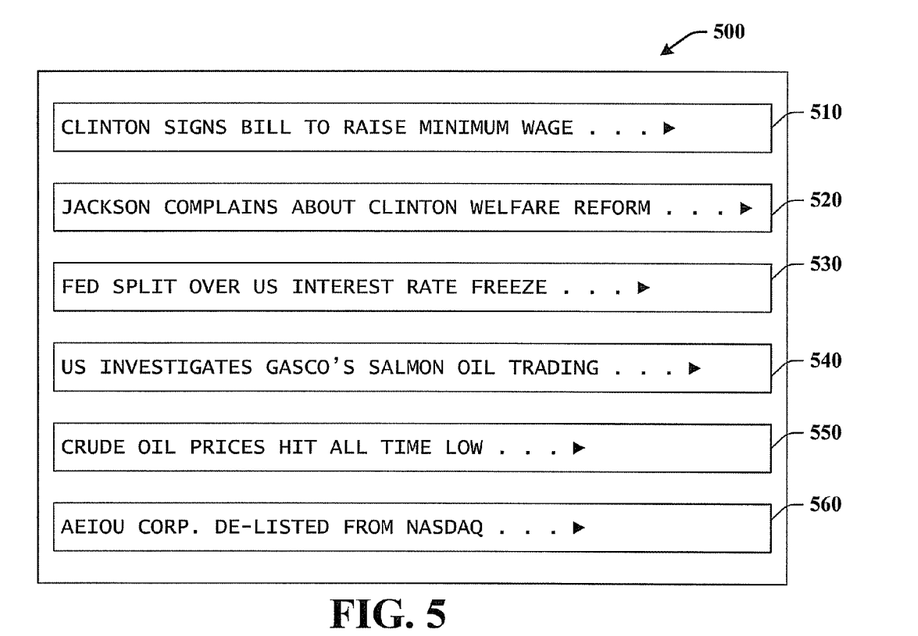
FIG. 5 illustrates a list of notifications generated by the queryline tracking system in accordance with one aspect of the disclosed subject matter.

FIG. 5 illustrates a list of notifications 500 generated by the queryline tracking system described and claimed herein. As depicted notifications 510-520 relate to President Clinton, and more specifically to President Clinton signing a bill to raise the minimum wage (510), and Jesse Jackson's complaint regarding President Clinton's welfare reform (520). Further, notifications 530-560 pertain to issues of a more financial nature, in particular, to the Federal Reserve's split decision on whether or not to freeze the US interest rate at its current level (530), a investigation by authorities in the United States regarding Gasco's salmon oil trading activities (540), that crude oil prices have reached an all time low (550), and that a corporation named AEIOU Corp has been de-listed from the NASDAQ exchange.

Figure 6:
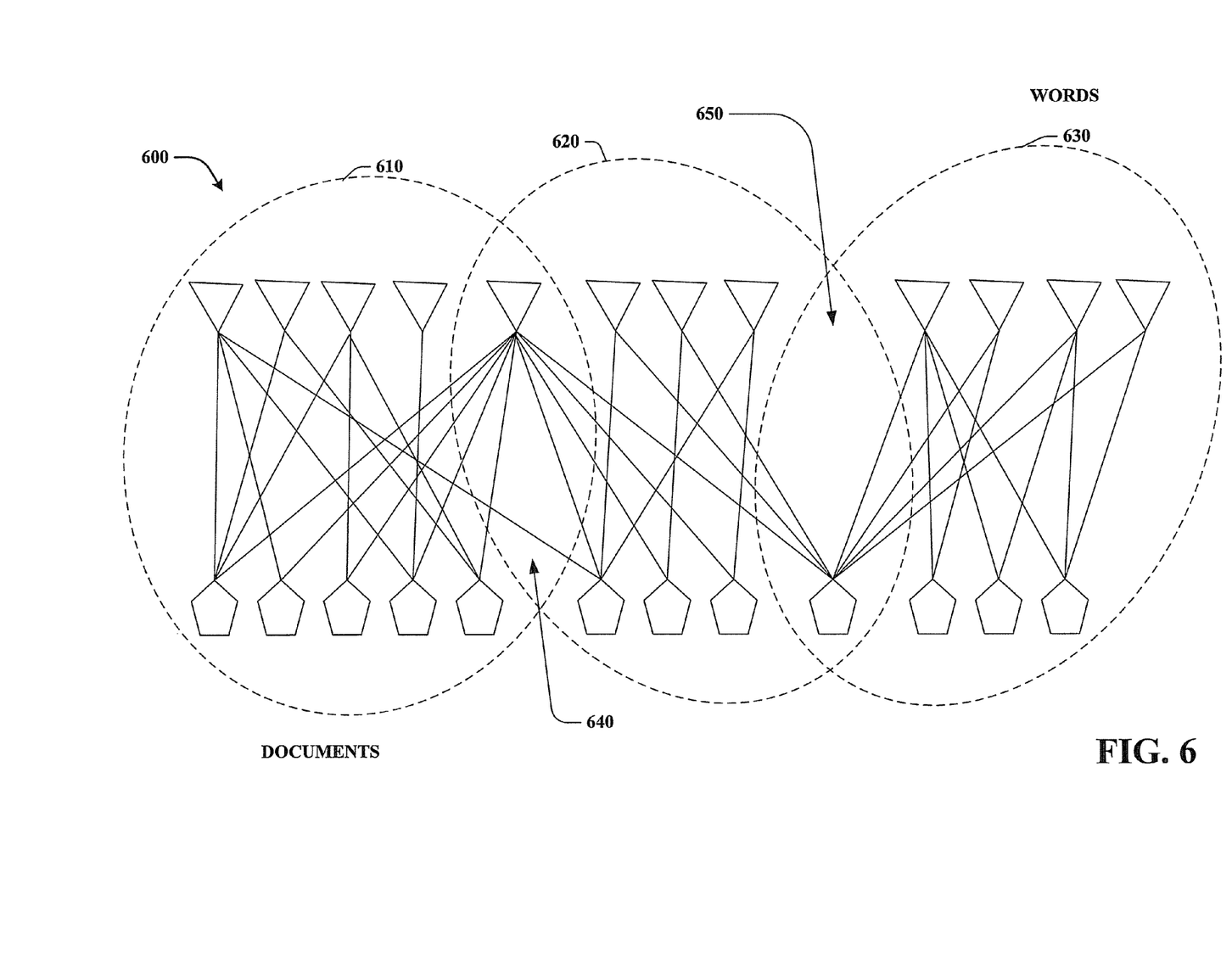
FIG. 6 illustrates a word-document co-occurrence matrix represented as a bipartite graph.

FIG. 6 illustrates a word-document co-occurrence matrix represented as a bipartite graph 600 with word nodes (represented as inverted triangles) on one-side and document nodes (represented as pentagons) on the other. Such a bi-partite graph can be constructed and utilized by the queryline tracking system disclosed and described herein. The queryline tracking system can utilize such a bi-partite graph in order to zoom in on subsets of words and documents that it believes as being representative of a particular theme. As illustrated in bipartite graph 600 three well connected clusters or groups 610, 620, and 630 related to a particular query are depicted. Cluster 610 can represent a first storyline or theme that has been surfaced by the queryline tracking system and cluster 620 can represent a second storyline or theme that has been surfaced by the queryline tracking system wherein the themes or storylines represented by clusters 610 and 620 relate in some manner to a query previously input by a user of the queryline tracking system. Further, cluster 630 can represent a newly induced or surfaced theme or storyline related to the query that the queryline tracking system has recently gleaned from news items/articles contained in a continuous stream of data.

As depicted, the bi-partite graph 600 can represent themes or storylines that can overlap such that clusters can share documents and words. Overlaps or intersections 640 and 650 illustrate this point, wherein overlap 640 depicts a nexus word that can be shared between clusters 610 and 620, and intersection 650 illustrates a common document that can be shared between clusters 620 and 630. To put the foregoing in better perspective, assume for example, that cluster 610 relates to stories about the President, cluster 620 pertains to stories about Iraq, and cluster 630 relates to approval ratings. Thus, in overlap 640 the common word that links clusters 610 and 620 can be "policy" thus indicative of stories related the President's policy in Iraq. Similarly, in overlap 650 the common document can be related to approval ratings in relation to Iraq. Consequently, the three illustrative clusters 610, 620, and 630 can be representative of, and generate a notification to be sent to a user regarding the President's approval ratings in relation to his policy in Iraq. It should be noted that the foregoing actions can also be performed using a variety of graph analysis techniques, e.g., normalized cut, min-cut, etc., and any and all such modalities will fall within the purview of the claimed subject matter.

Figure 7:
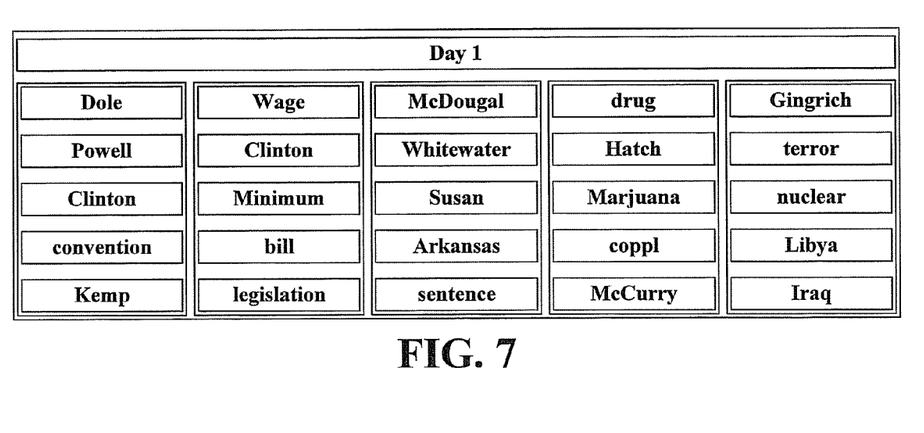
FIGS. 7-14 depict some illustrative results generated by the queryline tracking system.
Figure 8:
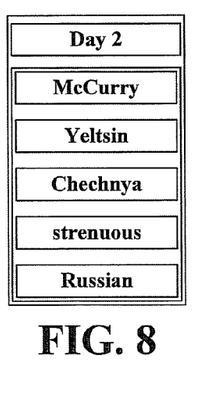
Figure 9:
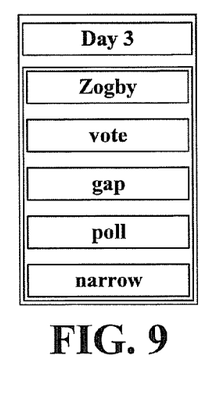
Figure 10:
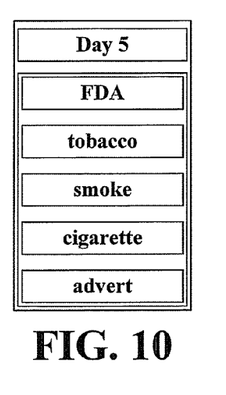
Figure 11:
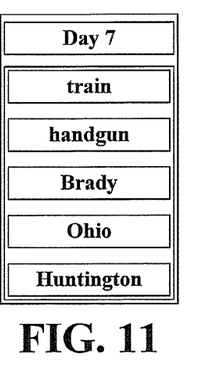
Figure 12:
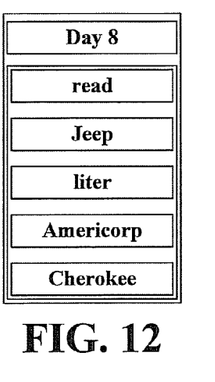
Figure 13:
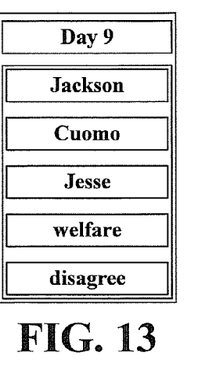
Figure 14:
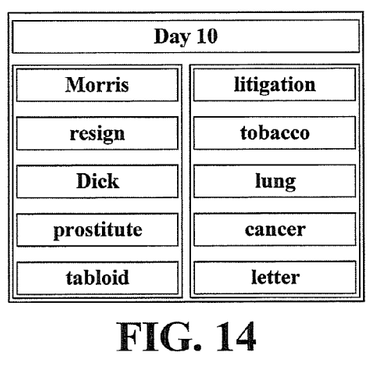

FIGS. 7-14 depict some illustrative results generated by the queryline tracking system described herein in response to query "Clinton". For purposes of illustration and not limitation results from the well known RCV1 data corpus that consists of Reuters news articles starting from Aug. 20-Aug. 31, 1996 have been employed to provide the following illustration. As depicted in FIG. 7 on the first day there were five themes (or stories) associated with Clinton, namely stories regarding the presidential election, Clinton signing a bill to raise the minimum wage, the Whitewater case in which Clinton was embroiled at the time, Senator Hatch complaining to Clinton about the increase in drug use, Newt Gingrich cautioning Clinton that the country needs to be able to pre-emptively deal with external nuclear threats. As illustrated in FIG. 7 each of the aforementioned themes is presented in a columnar fashion wherein each column represents a particular theme and associated keywords that can be utilized to generate an appropriate notification to be propagated to a user's computing/communications device.

As depicted in FIGS. 8-13 only one new theme was generated by the queryline tracking system on each of these days. On day 2 (FIG. 8) amongst the plethora of documents (e.g., streaming news articles) received by the queryline tracking system only one novel theme was identified therein as being relevant to the query "Clinton", namely, a story about Chechnya. Similarly, on day 3 (FIG. 9), day 5 (FIG. 10), day 7 (FIG. 11), day 8 (FIG. 12), and day 9 (FIG. 13) only individual themes were identified as being new, namely, a Zogby poll showing that President Clinton's poll gap with Senator Dole was narrowing, Clinton asking the FDA to move against illegal practices in tobacco advertising, and Jesse Jackson complaining about Clinton's welfare reform. On day 10 (FIG. 14) two new themes were identified in the stream of documents as being particularly relevant to the query Clinton, the resignation of presidential advisor Dick Morris, and a story regarding tobacco litigation. It will be noticed that no new themes were identified on days 4 and 6, this was due to the queryline tracking system receiving documents that related to themes that has already been generated, and as such any documents that were related with the query were subsumed by these earlier themes, and as a consequence no new themes were deemed to be necessary to adequately classify or categorize these documents.

Figure 15:
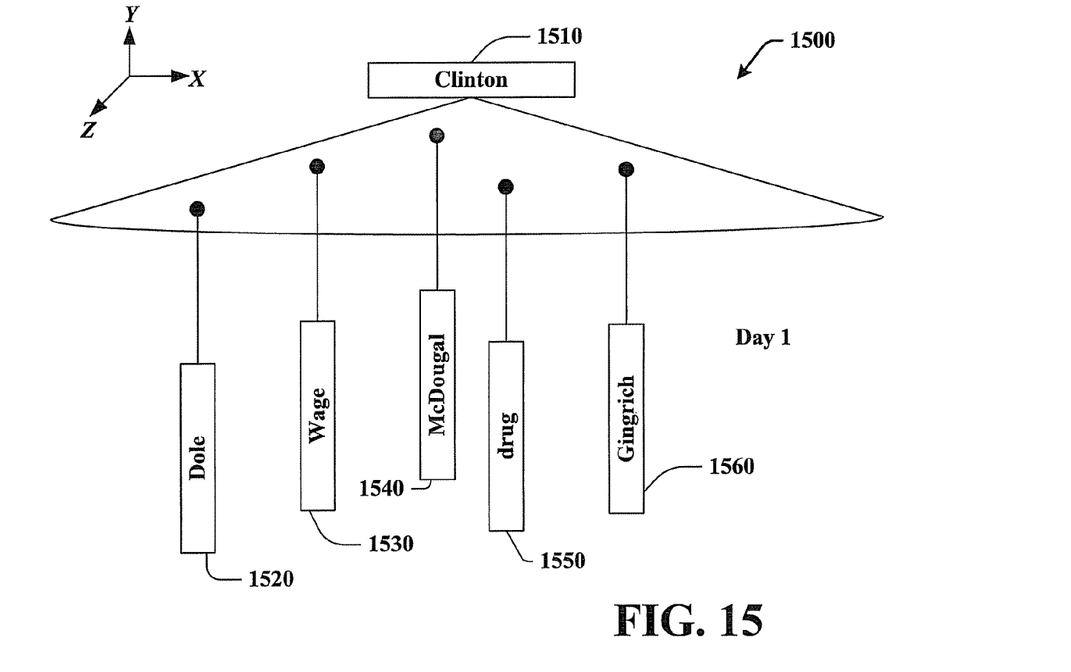
FIGS. 15-18 illustrate a three dimensional representation of a multi-dimensional clustering structure that can be utilized by the claimed subject matter to facilitate generation of an alert on the discovery of a new theme.

FIGS. 15-18 illustrate a three dimensional representation of a multi-dimensional clustering structure that can be utilized by the claimed subject matter. FIG. 15 depicts structure 1500 constructed on day one based on input query 1510 ("Clinton"). As illustrated five novel themes associated with query 1510 were induce or surfaced, namely theme 1520 pertaining to the presidential election, theme 1530 relating to Clinton signing a bill to raise the minimum wage, theme 1540 relating to the Whitewater scandal, theme 1550 relating to the increase in drug use as perceived by Senator Hatch, and theme 1560 pertaining to Newt Gingrich cautioning the need for the country to be able to pre-emptively deal with external nuclear threats.

Figure 16:
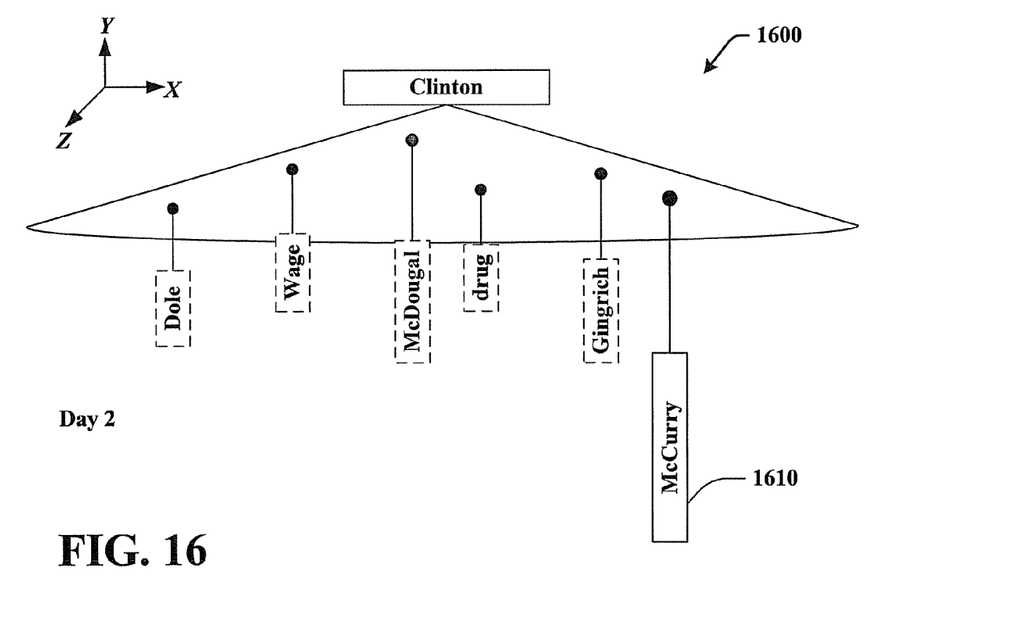

FIG. 16 depicts structure 1600 constructed on the second day. As illustrated structure 1600 contains the initial five themes (in dashed lines) that were associated with query 1610 as well as a new theme 1610 that the queryline tracking system has identified as being novel. Other documents that may have been received on day two either had no association whatsoever with query 1510, or if there were a relation with query 1510, the theme so identified was subsumed by one of the five earlier identified themes viz. 1520, 1530, 1540, 1550 and/or 1560.

Figure 17:
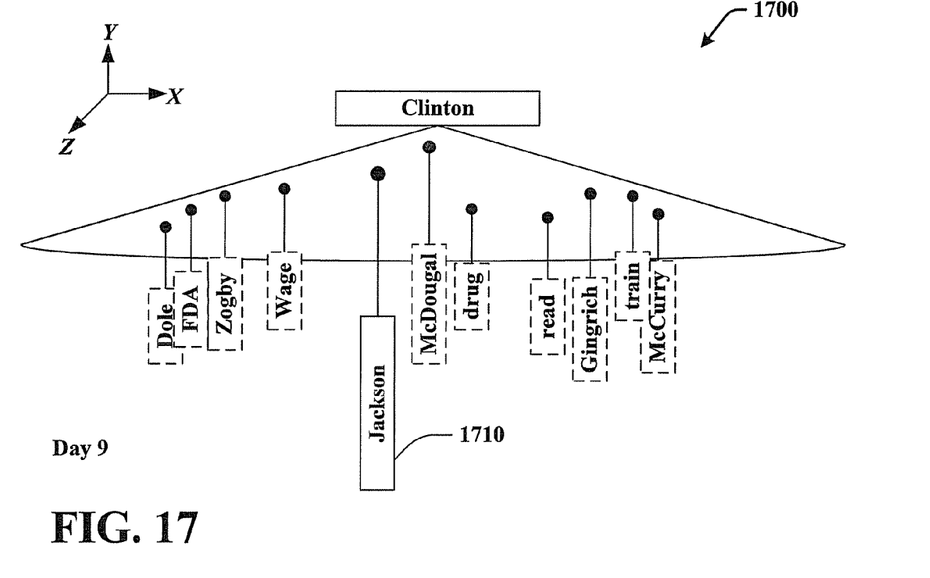

FIG. 17 illustrates structure 1700 constructed on day 9. As presented in FIG. 17 structure 1700 contains all the themes (shown in dashed lines) that have been previously induced during the past 8 days plus a new theme 1710 that the queryline tracking system has induced after analysis of the current batch of received documents. While it is to be understood that during the past 8 days that countless documents have been investigated and analyzed by the queryline tracking system only truly novel themes are generated for subsequent propagation to a user notification system.

Figure 18:
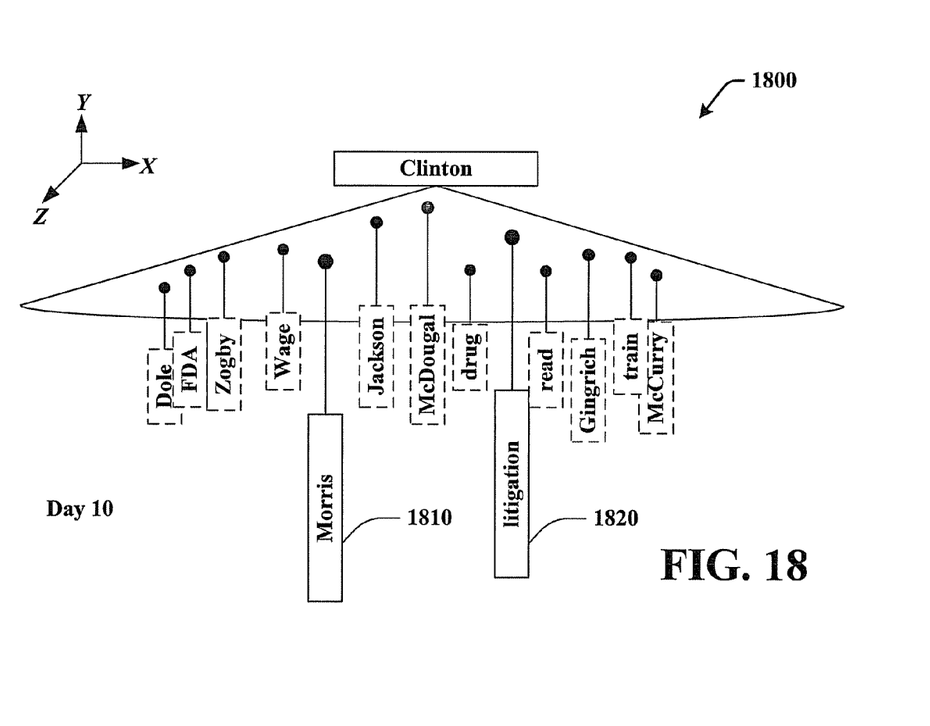

As a further illustration FIG. 18 depicts structure 1800 constructed on day 10 where two more themes 1810 and 1820 relating to the query Clinton have surfaced. These newly surfaced themes relate to the resignation of Dick Morris, President Clinton's presidential advisor and a story that relates to a litigation involving lung cancer. It should be noted that when the queryline tracking system that utilizes structures 1600-1900 induces or surfaces new themes associated with a particular query 1610, the system can utilize one or keywords associated with surfaced themes to generate humanly cognizable notifications that can be distributed to the one or more notification devices specified by a user as being his/her preferred modality for receipt of such notifications.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the subject innovation as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a system, method, apparatus, or article of manufacture using standard programming and/or engineering techniques to produce software, firmware, hardware or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 19:
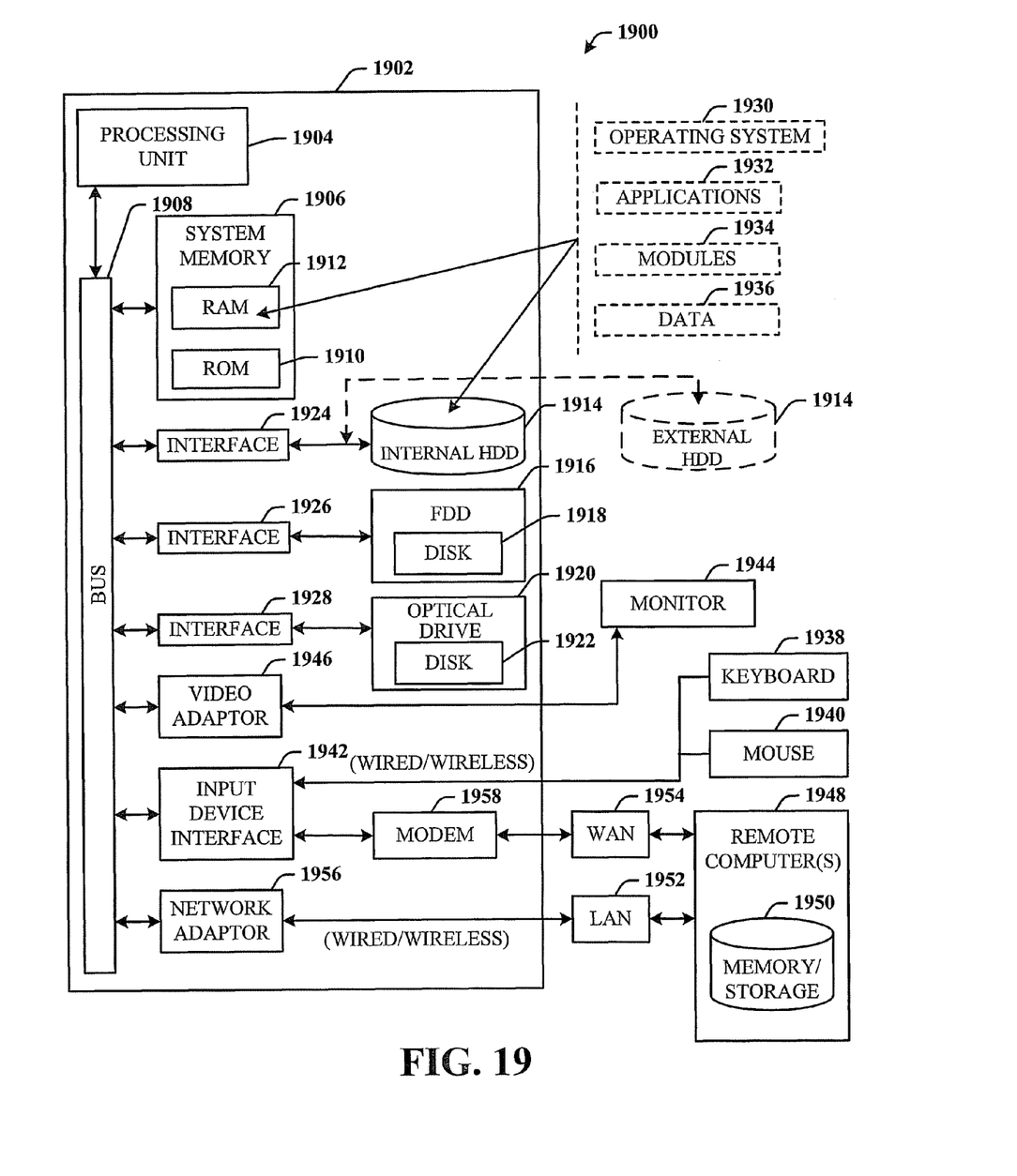
FIG. 19 illustrates a block diagram of a computer operable to execute the disclosed inference-based query completion architecture.

Referring now to FIG. 19, there is illustrated a block diagram of a computer operable to execute the disclosed query line tracking system. In order to provide additional context for various aspects thereof, FIG. 19 and the following discussion are intended to provide a brief, general description of a suitable computing environment 1900 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 19, the exemplary environment 1900 for implementing various aspects includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures may also be employed as the processing unit 1904.

The system bus 1908 can be any of several types of bus structure that may further interconnect to a memory bus (with or without a memory controller), a peripheral bus, and a local bus using any of a variety of commercially available bus architectures. The system memory 1906 includes read-only memory (ROM) 1910 and random access memory (RAM) 1912. A basic input/output system (BIOS) is stored in a non-volatile memory 1910 such as ROM, EPROM, EEPROM, which BIOS contains the basic routines that help to transfer information between elements within the computer 1902, such as during start-up. The RAM 1912 can also include a high-speed RAM such as static RAM for caching data.

The computer 1902 further includes an internal hard disk drive (HDD) 1914 (e.g., EIDE, SATA), which internal hard disk drive 1914 may also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. It is to be appreciated that the claimed subject matter can be implemented with various commercially available operating systems or combinations of operating systems.

A user can enter commands and information into the computer 1902 through one or more wired/wireless input devices, e.g., a keyboard 1938 and a pointing device, such as a mouse 1940. Other input devices (not shown) may include a microphone, an IR remote control, a joystick, a game pad, a stylus pen, touch screen, or the like. These and other input devices are often connected to the processing unit 1904 through an input device interface 1942 that is coupled to the system bus 1908, but can be connected by other interfaces, such as a parallel port, an IEEE 1394 serial port, a game port, a USB port, an IR interface, etc.

A monitor 1944 or other type of display device is also connected to the system bus 1908 via an interface, such as a video adapter 1946. In addition to the monitor 1944, a computer typically includes other peripheral output devices (not shown), such as speakers, printers, etc.

The computer 1902 may operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e g., a wide area network (WAN) 1954. Such LAN and WAN networking environments are commonplace in offices and companies, and facilitate enterprise-wide computer networks, such as intranets, all of which may connect to a global communications network, e.g., the Internet.

When used in a LAN networking environment, the computer 1902 is connected to the local network 1952 through a wired and/or wireless communication network interface or adapter 1956. The adaptor 1956 may facilitate wired or wireless communication to the LAN 1952, which may also include a wireless access point disposed thereon for communicating with the wireless adaptor 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wired or wireless device, is connected to the system bus 1908 via the serial port interface 1942. In a networked environment, program modules depicted relative to the computer 1902, or portions thereof, can be stored in the remote memory/storage device 1950. It will be appreciated that the network connections shown are exemplary and other means of establishing a communications link between the computers can be used.

The computer 1902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 20:
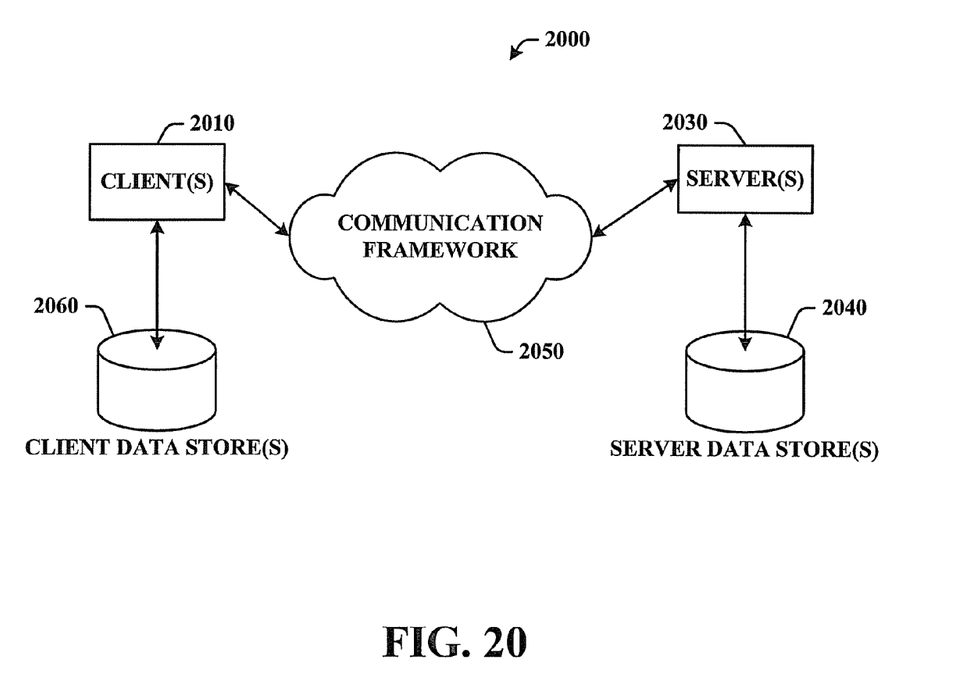
FIG. 20 illustrates a schematic block diagram of an exemplary computing environment for processing the inference-based query completion architecture in accordance with another aspect.

Referring now to FIG. 20, there is illustrated a schematic block diagram of an exemplary computing environment 2000 for processing the inference-based query completion architecture in accordance with another aspect. The system 2000 includes one or more client(s) 2002. The client(s) 2002 can be hardware and/or software (e.g., threads, processes, computing devices). The client(s) 2002 can house cookie(s) and/or associated contextual information by employing the claimed subject matter, for example.

The system 2000 also includes one or more server(s) 2004. The server(s) 2004 can also be hardware and/or software (e.g., threads, processes, computing devices). The servers 2004 can house threads to perform transformations by employing the invention, for example. One possible communication between a client 2002 and a server 2004 can be in the form of a data packet adapted to be transmitted between two or more computer processes. The data packet may include a cookie and/or associated contextual information, for example. The system 2000 includes a communication framework 2006 (e.g., a global communication network such as the Internet) that can be employed to facilitate communications between the client(s) 2002 and the server(s) 2004.

Communications can be facilitated via a wired (including optical fiber) and/or wireless technology. The client(s) 2002 are operatively connected to one or more client data store(s) 2008 that can be employed to store information local to the client(s) 2002 (e.g., cookie(s) and/or associated contextual information). Similarly, the server(s) 2004 are operatively connected to one or more server data store(s) 2010 that can be employed to store information local to the servers 2004.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented system that effectuates queryline tracking, comprising:
    an analysis component that constructs and utilizes an evolving topic model to discover, within one or more documents delivered in a stream, one or more themes or storylines associated with a query, wherein the evolving topic model is incrementally constructed as the one or more documents having new data are delivered in the stream;
    a ranking component that utilizes the one or more documents and the one or more themes or storylines to provide a relative ordering of the one or more documents with respect to the theme, the ranking component employing a word-document co-occurrence matrix represented by a bipartite graph constructed by the analysis component to provide the relative ordering of the one or more documents; and
    a notification component that generates and propagates an alert based at least in part on the relative ordering and a novelty related to the one or more themes or storylines.

2. The system of claim 1, further including a summarization component that constructs a notification statement from keywords associated with the one or more themes or storylines, the notification statement included in the alert.

3. The system of claim 1, the query is a sequence of text representative of a topic in which a user expresses an interest.

4. The system of claim 1, further including a separation component that receives the query and the stream from an interface component and identifies the one or more documents in the stream that correspond with the query.

5. The system of claim 4, the separation component identifies the one or more documents that correspond with the query via utilization of a broad match association.

6. The system of claim 4, the separation component identifies the one or more documents by establishing a correspondence between a number of times a query occurs within the one or more documents.

7. The system of claim 4, the separation component identifies the one or more documents by determining whether the one or more documents contain words synonymous with the query.

8. The system of claim 1, the evolving topic model employs an incremental aspect model with probabilistic and spectral techniques to discover the one or more themes or storylines within the one or more documents.

9. The system of claim 1, the analysis component employs one or more previously discovered themes to cluster the one or more documents around the one or more previously discovered themes.

10. A method implemented on a machine for effectuating queryline tracking, comprising:
   - constructing an evolving topic model incrementally as a plurality of documents having new data are delivered in a stream;
   - identifying within the plurality of documents delivered in the stream a document that corresponds with a query received from an interface;
   - utilizing the evolving topic model to induce a theme associated with the query in the document;
   - scoring the document relative to previously identified documents with respect to the theme, the scoring further includes employing a word-document co-occurrence graph to score the document relative to the previously identified documents; and
   - disseminating a notification based at least in part on the theme to one or more computing or communications devices.

11. The method of claim 10, further comprising utilizing one or more keywords associated with the theme to generate a message included with the notification.

12. The method of claim 10, the identifying further including establishing a correspondence between the query and one or more synonyms included in the document.

13. The method of claim 10, further including associating the document with one or more previously induced themes clustered around the query.

14. The method of claim 10, the one or more computing or communications devices includes at least a Personal Digital Assistant, a cell phone, a notebook computer, and a handheld computer.

15. An article of manufacturer having a processor that facilitates queryline tracking, comprising:
   - means for constructing and employing a dynamically maturing topic model to surface a theme associated with a query from a stream of documents, wherein the dynamically maturing topic model is incrementally constructed as the one or more documents having new data are delivered in the stream;
   - means for ranking the one or more documents and the theme to provide a relative ordering of the one or more documents with respect to the theme, the ranking component employing a word-document co-occurrence matrix represented by a bipartite graph to provide the relative ordering of the one or more documents; and
   - means for distributing a notification to a communications device based on the surfaced theme.

16. The article of manufacturer of claim 15, further including:
   - means for locating a document from the stream of documents that corresponds with the query; and means for ordering the document relative to previously located documents with respect to the theme.

17. A computer implemented system that produces queryline tracking, comprising:
   - a processor coupled to a memory;
   - an analysis component for constructing an evolving topic model to discover one or more themes associated with a query within one or more documents having new data delivered in an incremental stream, wherein the evolving topic model is incrementally constructed as the one or more documents are delivered in the stream;
   - a notification component that generates an alert based at least in part on the relative ordering and a novelty related to the one or more themes;
   - a summarization component that constructs a notification statement associated with each of the one or more themes or storylines, the notification statement included in the alert and containing a summary that includes keywords, sentence summaries and pre-defined concepts for each of the one or more themes; and
   - a ranking component that utilizes the one or more documents and the one or more themes or storylines to provide a relative ordering of the one or more documents with respect to the theme, wherein the ranking component employs a word-document co-occurrence matrix represented by a bipartite graph constructed by the analysis component to provide the relative ordering of the one or more documents.

* * * * *